United States Patent
Maurey

[15] 3,661,023
[45] May 9, 1972

[54] ADJUSTABLE PULLEY CONSTRUCTION

[72] Inventor: Joseph E. Maurey, Chicago, Ill.
[73] Assignee: Maurey Manufacturing Corporation, Chicago, Ill.
[22] Filed: Dec. 15, 1970
[21] Appl. No.: 98,276

[52] U.S. Cl................74/230.17, 287/52.05, 287/52.08
[51] Int. Cl.....................................................F16h 55/52
[58] Field of Search............74/230.17 C; 287/52.05, 52.08; 416/207

[56] References Cited

UNITED STATES PATENTS

| 1,649,895 | 11/1927 | Gade | 287/52.08 |
| 2,618,495 | 11/1952 | Maurey | 287/52.08 |
| 2,633,031 | 3/1953 | Browning | 74/230.17 C |
| 2,641,981 | 6/1953 | Pilsner | 74/230.17 C |
| 2,855,787 | 10/1958 | Kumro et al. | 74/230.17 C |
| 3,063,300 | 11/1962 | Chung | 74/230.17 C |

Primary Examiner—C. J. Husar
Attorney—McDougall, Hersh & Scott

[57] ABSTRACT

An adjustable pulley construction comprising a pair of discs each having a centrally located hub and defining opposed belt engaging surfaces. The hubs are threaded or otherwise designed for relative axial movement whereby the distance between the belt engaging surfaces can be adjusted. Means are provided for securing the hubs together including a set screw located in a threaded bore defined by the exterior hub. The set screw defines a tapered end which is received within a tapered opening formed in a key located in line with the threaded bore. This key is inserted between the end of the bore and the surface of the inner hub. As the set screw is rotated, the degree of pressure applied by the key on the inner hub can be adjusted whereby an extremely secure relationship between the hubs can be achieved.

8 Claims, 7 Drawing Figures

PATENTED MAY 9 1972

3,661,023

INVENTOR
Joseph E. Maurey
by McDougall, Hersh
and Scott Attys

ADJUSTABLE PULLEY CONSTRUCTION

This invention relates to an adjustable pulley construction. The invention will be particularly described with reference to pulleys connected between drive motors and shafts which may be employed in various types of equipment.

In an increasing number of applications, relatively high horse power motors are being employed; for example, in applications which require the movement of air, as in industrial heating and cooling systems, relatively large fans are utilized and these required V-belts which carry as much as 15 HP. Often the fans will be driven by means of 2-groove variable pitch pulleys.

As capacity requirements increase, the demands on pulley structures have also increased. In many applications, belts are required to carry as much as 20 HP and this has led to certain mechanical difficulties where variable pitch pulleys are employed. Thus, such pulleys include a pair of opposing discs, each having an independent hub with the hubs being relatively movable so that the spacing between the pulley discs can be varied. In the usual case, set screws are utilized for securing the hubs of the discs once the desired spacing has been set for a particular application. The set screws have, however, been found to be incapable of holding the hubs where high horse powers are involved. In some instances, the common set screw approach has resulted in failure in applications requiring only about 7½ HP per belt.

It is a general object of this invention to provide an improved design for variable pitch pulleys whereby the pulleys can be more efficiently employed in applications requiring a high load.

It is a more specific object of this invention to provide an improved means for securing pulley discs of variable speed pulleys whereby the likelihood of failure of the pulleys under high load conditions can be substantially reduced.

It is a still further object of this invention to provide an improved means for locking the hubs of pulley discs in variable pitch pulleys whereby the spacing between the pulley discs can be accurately maintained for extended periods of time under high load operating conditions.

These and other objects of this invention will appear hereinafter and, for purposes of illustration but not of limitation, a specific embodiment of the invention is illustrated in the accompanying drawing in which.

This invention generally relates to an adjustable or variable pitch pulley construction utilizing two or more discs defining opposing belt engaging surfaces. Each disc is provided with an axially extending hub and these hubs are designed for relative movement. For example, the hub of one pulley may be externally threaded and the hub of the other pulley internally threaded whereby relative rotation will result in changes in the spacing between the hubs. The disc faces taper outwardly to form a V shaped channel and V-belts are provided with tapering sidewalls which mate with the disc faces. The position of the belt relative to the pulley axis will therefore vary depending upon the spacing between the discs.

In the use of pulleys of the type described, the pulleys are located in position on a shaft and adjustments in the relative disc positions are made until the proper drive characteristics are achieved. Thus, where the pulley discs are threaded, relative rotation is undertaken after which means are provided for locking the discs together. In most instances, the disc spacing will remain the same unless a further adjustment is required or until there is some maintenance problem.

The specific improvements of the invention relate to the means employed for securing the pulley discs in the desired position. These securing means are utilized in conjunction with pulleys which have hub portions which are concentrically located. The outer hub portion will then be positioned in surrounding relationship relative to the inner hub portion irrespective of the relative axial position of the hubs.

The securing arrangement is provided by means of a threaded bore defined by the outer hub portion with a set screw being received in the bore. The set screw defines a tapered end, and a key is inserted between the hubs. This key defines a tapered bore for engagement with the tapered end of the set screw whereby turning of the set screw will operate to move the tapered end relative to the tapered bore to provide a camming action for positively applying pressure to the key. The key is preferably located within a recess defined by the outer hub and in engagement with a seat or land defined by the inner hub to provide a positive locking engagement of the hubs.

Figure 3:
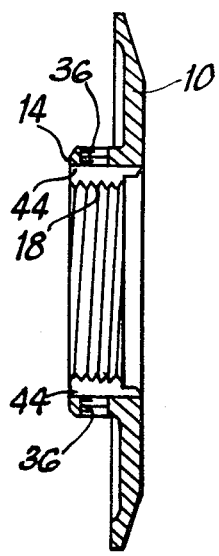
FIG. 3 is a vertical sectional view illustrating a pulley disc having an external hub.
Figure 4:
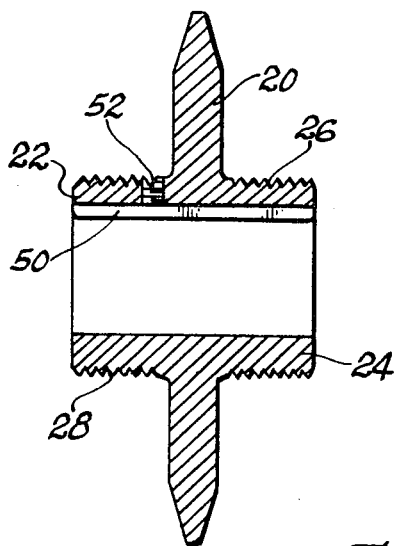
FIG. 4 is a vertical sectional view illustrating the pulley disc having oppositely directed belt engaging faces and oppositely directed hub portions.
Figure 5:
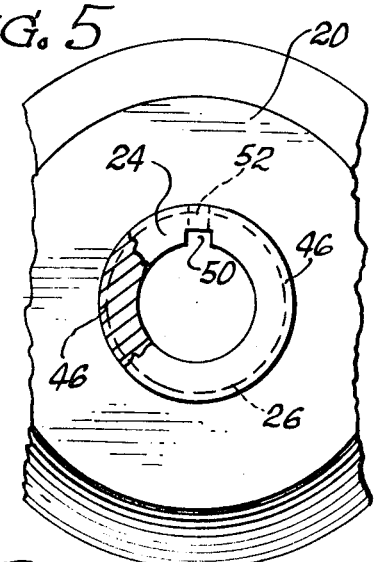
FIG. 5 is a fragmentary end elevation of the disc shown in FIG. 4.
Figure 6:
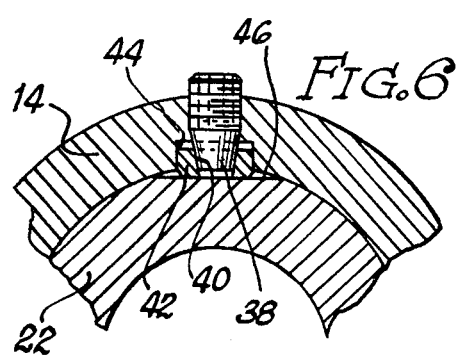
FIG. 6 is an enlarged fragmentary view taken about the line 6—6 of FIG. 2.
Figure 7:
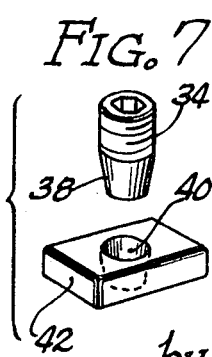
FIG. 7 is an exploded detail view illustrating the set screw and key members utilized in the construction of the invention.

The drawings illustrate an adjustable pulley construction comprising a pair of movable discs 10 and 12 having hub portions 14 and 16, respectively. As best shown in FIG. 3, the central opening 18 of disc 10 is threaded, and this is also true of the disc 12.

Figure 1:
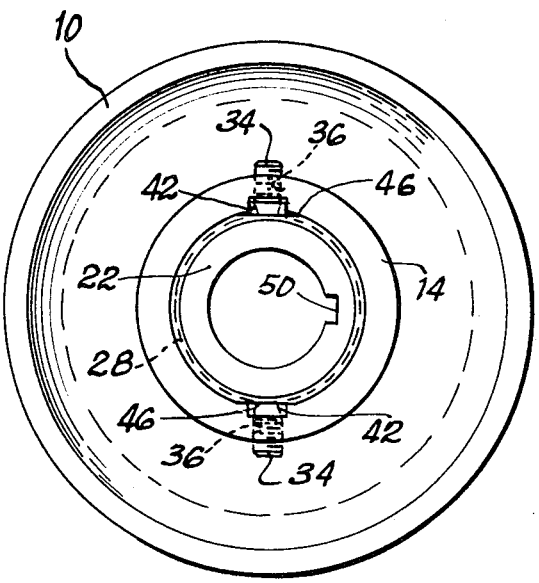
FIG. 1 is an end elevation of a pulley construction characterized by the features of this invention.
Figure 2:
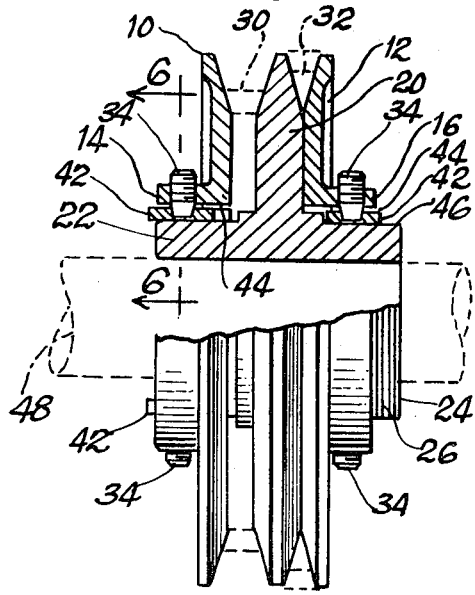
FIG. 2 is a side elevation, partly cut away, of the pulley construction.

The discs 10 and 12 are mounted on a centrally located disc 20 having hub portions 22 and 24 extending outwardly therefrom. These disc portions are externally threaded as shown at 26 and 28 whereby the discs 10 and 12 can be attached to the discs 20 with the hubs being located in surrounding relationship, and with the outer hubs being rotatable relative to the inner hubs for axial movement. FIG. 2 illustrates the hub 10 in an outer position and the hub 12 in an inner position; however, it will be appreciated that in the usual application, the respective hubs will be adjusted for the same spacing relative to the hub 20 whereby pulley belts 30 and 32 will transmit the same driving action.

In accordance with the concepts of this invention, the hubs are secured together by means of a set screw 34 which is received in one of the threaded bores 36 defined by the hubs 14 and 16. Each set screw 34 comprises a threaded main body portion and a tapered end portion 38. This tapered end portion is adapted to be received within a tapered bore 40 defined by key 42. It will be appreciated that a plurality of the set screw and key combinations can be located on each hub to provide sufficient locking force.

The keys 42 each comprise a rectangular block, and a recess 44 is defined at the end of each bore 36 for receiving one of the keys. In addition, a plurality of seats or lands 46 are formed on each of the hubs 22 and 24. During adjustment of the outer discs, an operating position is chosen so that the recesses 44 of the outer discs will be in line with the lands 46.

In the use of the securing means of this invention, the disc 20 is first secured to shaft 48 by keying the hub portions thereof to the shaft through the use of slot 50, and by holding the disc against axial movement by locating a conventional set screw in the threaded bore 52. The spacing between the belt engaging faces of the hubs is then adjusted for purposes of changing the spacing between the axis of the shaft carrying the pulley and the belts. This spacing, of course, determines the speed imparted to the pulley construction and the positions of the V-belts may be varied between the positions illustrated in FIG. 2.

The structure of this invention provides an extremely convenient means for the user of the pulley to make the necessary adjustment. Specifically, the pulley manufacturer may supply the structure with the discs in any arbitrary relationship and with the set screws 34 tightened against the keys 42. By loosening the set screws about three turns, the discs can be rotated without freeing the keys since the ends of the set screws will still be located in the key bores 40.

When the spacing to achieve the desired position of the V-belts has been determined, some slight additional adjustment may be necessary in order to locate recesses 44 and the associated keys opposite lands 46. The set screws are then rotated until sufficient locking pressure is a achieved. This technique for adjustment is extremely important to the user since maintaining of the keys in position throughout adjustment avoids the necessity for lining up the keys and set screw by the user.

It will be noted that the ends of the set screws do not come into contact with the surfaces of the lands 46. Thus, the locking pressure is achieved by means of the cam action provided between the tapered ends 38 and tapered bores 40. The improvements of the invention are not dependent upon the usual action of a set screw wherein the end of the screw is secured tightly against a surface.

It has been found that the described arrangement provides substantial improvements in operations requiring the use of relatively high loads on pulley constructions. Thus, the pulleys of this invention have been utilized in applications requiring loads in excess of 20 HP per pulley with completely satisfactory performance. Although the description refers to the application of the invention to 2-groove pulleys, it will be appreciated that one groove pulleys and pulleys with more than two grooves may also employ the features of this invention.

It will be understood that various changes and modifications may be made in the above described construction which provide the characteristics of this invention without departing from the spirit thereof, particularly as defined in the following claims.

That which is claimed is:

1. In an adjustable pulley construction comprising a first disc having at least one belt engaging surface and having a centrally located hub, a second disc defining at least one belt engaging surface and having a centrally located hub, the hub of said second disc being connected to the hub of said first disc and being axially movable relative thereto, said belt engaging surfaces being positioned in facing relationship whereby a pulley belt can be located therebetween, the improvement in means for securing the respective hubs together to thereby maintain a desired spaced relationship between said belt engaging surfaces, said securing means including a threaded bore defined by the hub of one of said discs, a set screw received in said bore, said set screw defining a tapered end position, a land defined by said other hub located in line with said set screw, and a key inserted between the bore in said one hub and the land of the other hub whereby one surface of the key engages said land, said key defining a tapered bore for engagement with the tapered end of said set screw, turning of said set screw operating to move said tapered end relative to said tapered bore to provide a camming action whereby turning of said set screw operates to vary the pressure applied by said key to said land for determining the force employed in securing the hubs together.

2. A construction in accordance with claim 1 wherein said key comprises a rectangular block, a recess defined on the exterior surface of said other hub for receiving said key.

3. A construction in accordance with claim 2 wherein a plurality of lands are located around the periphery of said other hub, and including a plurality of threaded bores formed in said one hub whereby a plurality of set screws and keys can be employed for securing of said hubs.

4. A construction in accordance with claim 1 wherein the end of said set screw is conically shaped, and wherein the opening defined by said key provides a substantially similar shape for engagement with the end of said set screw.

5. A construction in accordance with claim 1 wherein said other hub defines external threads with corresponding internal threads being defined by said one hub whereby the relative positions of the hubs is achieved through relative rotation of the hubs.

6. A construction in accordance with claim 5 wherein said land is formed by removing a portion of the externally threaded hub to provide a flat surface for engagement with said key.

7. A construction in accordance with claim 5 wherein said second disc defines a pair of oppositely extending, externally threaded hubs, and wherein one of said first discs is secured on each of the externally threaded hubs whereby a pair of adjustable pulley arrangements are provided.

8. A construction in accordance with claim 4 wherein the dimensions of said set screw and said opening in said key are such that the end of the set screw does not contact the surface of said land when the hubs have been secured together.

* * * * *